Feb. 12, 1957   S. H. VUNCANNON   2,781,037
BARBECUE OVEN
Filed March 1, 1954

SAM H. VUNCANNON
INVENTOR.

United States Patent Office 2,781,037
Patented Feb. 12, 1957

2,781,037

BARBECUE OVEN

Sam H. Vuncannon, Coral Gables, Fla.

Application March 1, 1954, Serial No. 413,287

5 Claims. (Cl. 126—25)

This invention relates to new and useful improvements in barbecue ovens and the primary object of the present invention is to provide a barbecue oven having a novel and improved coal-tray raising and lowering mechanism, whereby edibles placed upon the open top of the oven may be subjected to varied amounts of cooking heat.

Another important object of the present invention is to provide a barbecue oven preferably constructed of aluminum material, whereby the same may be readily and conveniently moved or transported from one location to another with minimum effort.

A further object of the present invention is to provide a raising and lowering mechanism for barbecue ovens including a novel and improved guiding means for the purpose of effectively guiding and retaining the coal-holding tray of the oven as the latter is raised or lowered while maintained in a horizontally disposed position.

A still further aim of the present invention is to provide a barbecue oven of the aforementioned character that is extremely simple and practical in construction, strong and reliable in use, small and compact in structure, neat and attractive in appearance, relatively inexpensive to manufacture, and otherwise well adapted for the purposes for which the same is intended.

Further objects and advantages of the invention will be apparent upon reading of the subjoined description in connection with the accompanying drawing in which.

Figure 1:
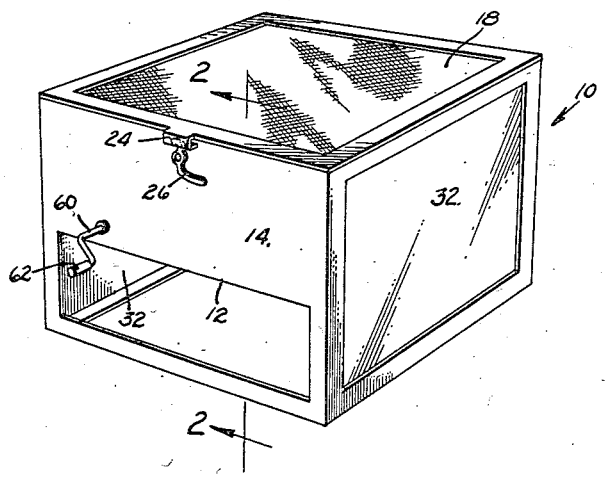
Figure 1 is a perspective view of the present invention.
Figure 2:
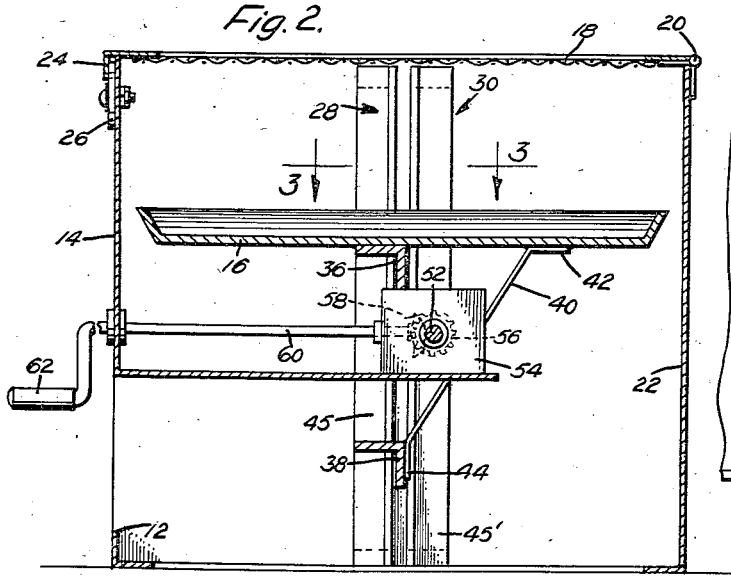
Figure 2 is a vertical sectional view taken substantially on the plane of section line 2—2 of Figure 1.
Figure 4:
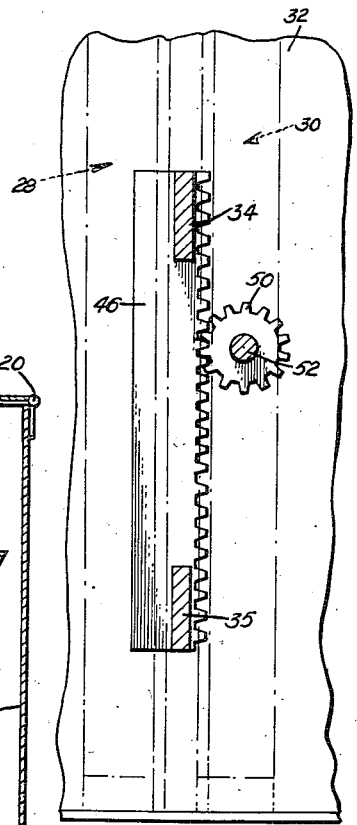

Referring now to the drawings in detail, wherein for the purpose of illustration, there is disclosed a preferred embodiment of the present invention, the numeral 10 represents a substantially rectangular cabinet member having an opening 12 in the lower portion of its forward wall 14 to admit air that will be accessible to a coal-holding tray 16 located within the member 10.

The upwardly facing horizontal tray 16 opposes the grill or foraminous top wall 18 of the member 10 which is hinged, as at 20, to the rear wall 22 of member 10. The front edge of wall 18 carries a keeper element 24 that is cammingly engaged by a locking member 26 on the front wall 14 to maintain the top wall 18 in its closed or lowered position.

Figure 3:
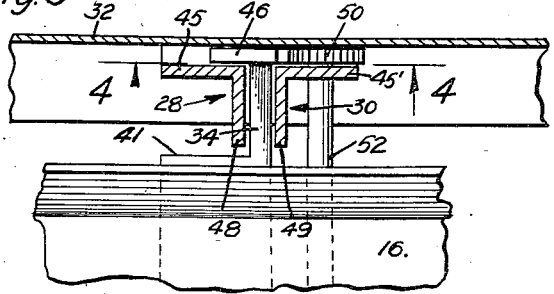
Figure 3 is an enlarged transverse horizontal sectional view taken substantially on the plane of section line 3—3 of Figure 2; and, Figure 4 is a fragmentary vertical sectional view taken substantially on the plane of section line 4—4 of Figure 3.

Back to back, forward and rear, vertical angle iron guide members 28 and 30 are suitably fixedly secured to the side walls 32 of the cabinet member 10 and slidably receive therebetween the extended end portions 34 and 35 of upper and lower angle iron slide bars 36 and 38. The portions 34 are formed by the formation of end notches 41 in the slide bars 36 and 38 as illustrated in Figure 3 of the drawings.

Tray 16 is suitably secured upon the upper slide bar 36 and is connected to the lower slide bar 38 through the medium of a suitable number of inclined connecting and bracing straps 40 having angulated upper and lower ends 42 and 44 that are suitably fixed to the tray 16 and bar 38.

The parallel flanges 45 and 45' of the angle iron guide members 28 and 30 are spaced parallel to the side walls 32 to permit vertical rack bars 46, fixed to the end portions 34, to be located between the flanges 45 and side walls 32 and thereby guided against accidental lateral movement. The end portions 34 are disposed relatively close to the parallel flanges 48 and 49 of the guide members 28 and 30 to restrict horizontal movement of the bars 36 and 38 and, thereby, assure positive engagement of the teeth of rack bars 46 with gears 50 fixed to the ends of a horizontal shaft 52 journaled for rotation in horizontal apertures in the flanges 45' of the rearmost angle iron guide members 30.

Shaft 52 passes through a gear box 54 suitably supported by the cabinet member 10. A gear 56 is attached to the shaft 52 and meshes with a complemental gear 58 attached to a relatively perpendicular horizontal shaft 60 extending from the box 54, whereby rotation of shaft 60 will effect a similar rotation of shaft 52. A crank handle 62 is suitably secured to or integrally formed with shaft 60 and extends forwardly beyond the opening 12 to permit convenient grasping of the handle, to facilitate actuation of shaft 60.

In practical use of the present invention, steak or other suitable meat, or the like, is placed upon the top wall 18 and coal, not shown, is placed in the tray 16 and ignited. By manipulating the crank handle 62, the tray may be raised or lowered to increase or decrease the heat effect upon the articles on the top wall 18.

From the foregoing detailed description of the preferred embodiments of the invention it will be evident to those skilled in the art that minor changes and modifications might be made without departing from the spirit and scope of the following claims.

Having described the invention, what is claimed as new is:

1. A barbecue oven comprising a substantially rectangular cabinet member having a pair of spaced parallel side walls and a horizontal foraminous top wall, forward and rear pairs of vertically disposed back to back spaced parallel forward and rear angle iron guide members fixed in the cabinet member and having flanges paralleling the side walls, upper and lower horizontal slide bars having end portions disposed between said forward and rear guide members for sliding movement, vertically disposed rack bars fixed to said end portions and located between said flanges and said side walls for vertical movement, means partially carried by said guide members and operatively connected to said rack bars for imparting reciprocatory motion to the latter, and a horizontally disposed upwardly facing tray supported on said upper slide bar and connected to said lower slide bar for movement with said slide bars selectively toward and away from said top wall.

2. A barbecue oven comprising a substantially rectangular cabinet member having a pair of spaced parallel side walls and a horizontal foraminous top wall, forward and rear pairs of vertically disposed back to back spaced parallel forward and rear angle iron guide members fixed in the cabinet member and having flanges paralleling the side walls, upper and lower horizontal slide bars having end portions disposed between said forward and rear guide members for sliding movement, vertically disposed rack bars fixed to said end portions and located between said flanges and said side walls for vertical movement, a horizontally disposed shaft rotatably supported by said guide members, gears fixed to the ends of said shaft and engaging said rack bars, a manually rotatable shaft carried by said cabinet member and operatively engaging the first named shaft for rotating the latter, a tray horizontally disposed on said upper slide bar and facing said top wall, and brace and connecting means joining said tray to said lower slide bar.

3. A barbecue oven comprising a substantially rectangular cabinet member having a pair of spaced parallel side walls and a horizontal foraminous top wall, forward and rear pairs of vertically disposed back to back spaced parallel forward and rear angle iron guide members fixed in the cabinet member and having flanges paralleling the side walls, upper and lower horizontal slide bars having end portions disposed between said forward and rear guide members for sliding movement, vertically disposed rack bars fixed to said end portions and located between said flanges and said side walls for vertical movement, means partially carried by said guide members and operatively connected to said rack bars for imparting recpricoatory motion to the latter, and a horizontally disposed upwardly facing tray supported on said upper slide bar and connected to said lower slide bar for movement with said slide bars selectively toward and away from said top wall, said rack bars overlapping said flanges of said forward and rear guide members and being guidingly retained between said side walls and said guide members.

4. A barbecue oven comprising a substantially rectangular cabinet member having a pair of spaced parallel side walls and a horizontal foraminous top wall, forward and rear pairs of vertically disposed back to back spaced parallel forward and rear angle iron guide members fixed in the cabinet member and having flanges paralleling the side walls, upper and lower horizontal slide bars having end portions disposed between said forward and rear guide members for sliding movement, vertically disposed rack bars fixed to said end portions and located between said flanges and said side walls for vertical movement, means partially carried by said guide members and operatively connected to said rack bars for imparting reciprocatory motion to the latter, and a horizontally disposed upwardly facing tray supported on said upper slide bar and connected to said lower slide bar for movement with said slide bars selectively toward and away from said top wall, said rack bars overlapping said flanges of said forward and rear guide members and being guidingly retained between said side walls and said guide members, said upper and lower slide bars having horizontal flanges with end notches accommodating said forward guide members to provide walls restricting horizontal movement of said slide bars relative to said guide members.

5. An oven comprising a housing, first and second pairs of back to back vertically disposed angle guide rails fixed in said housing, means for supporting a supply of fuel, said means being located in said housing and extending horizontally between said first and second pairs of guide rails, a first rack bar disposed between said first pair of guide rails for vertical sliding movement, a second rack bar disposed between said second pair of guide rails for vertical sliding movement, said rack bars being fixed to said supporting means for movement therewith, a horizontal driven shaft extending between and rotatably supported by said guide rails and disposed in said housing, gears fixed on the ends of said shaft meshing directly with said rack bars, and means rotatably supported by said housing and operatively connected to said driven shaft for rotating the latter.

References Cited in the file of this patent
UNITED STATES PATENTS

| | | |
|---|---|---|
| 2,386,815 | Rubenstein | Oct. 16, 1945 |
| 2,507,243 | Boyd et al. | May 9, 1950 |
| 2,575,082 | Wolff | Nov. 13, 1951 |